United States Patent
McLoughlin et al.

(10) Patent No.: US 6,226,305 B1
(45) Date of Patent: May 1, 2001

(54) APPARATUS MULTIPLEXING SYSTEM

(76) Inventors: John E. McLoughlin, 26 Southern Blvd., Nesconset, NY (US) 11767; Neocles G. Athanasiades, 6 Maybeck Dr., East Setauket, NY (US) 11733; Toh Kiam Meng, 15 Sunflower Dr., Hauppage, NY (US) 11788

(*) Notice: Subject to any disclaimer, the term of this patent is extended or adjusted under 35 U.S.C. 154(b) by 0 days.

(21) Appl. No.: 08/965,535

(22) Filed: Nov. 6, 1997

(51) Int. Cl.[7] ........................................ H02H 3/08
(52) U.S. Cl. ........................ 370/532; 307/29; 307/38; 340/459; 340/825.06
(58) Field of Search .................. 370/532, 539, 370/541, 534, 535, 537, 538, 540, 252; 307/29, 38; 340/518, 521, 459, 825.06

(56) References Cited

U.S. PATENT DOCUMENTS

| | | | |
|---|---|---|---|
| 4,639,609 | * | 1/1987 | Floy et al. ................................ 307/38 |
| 4,782,330 | * | 11/1988 | Tindall et al. ........................ 340/541 |
| 5,583,419 | * | 12/1996 | Haller ...................................... 307/29 |
| 5,856,711 | * | 1/1999 | Kato et al. ............................. 307/38 |

* cited by examiner

*Primary Examiner*—Ricky Ngo
(74) *Attorney, Agent, or Firm*—Louise S. Heim

(57) ABSTRACT

A multiplexing system is provided for controlling and monitoring all the electrical functions of a vehicle. The system includes a switch control unit which receives inputs from various sources and converts the inputs into digital signals which are decoded in a microprocessor. The decoded signals are then sent to a power distribution unit, which sends out, shuts off, increases or decreases the power to different parts of the vehicle as needed.

12 Claims, 1 Drawing Sheet

1

APPARATUS MULTIPLEXING SYSTEM

BACKGROUND OF THE INVENTION

Over the years, fire trucks have evolved from simple vehicles for transporting hoses, pumps, and hooks and ladders to sophisticated command centers for controlling all aspects of the firefighting operation, from communications to nozzle pressure regulation. The increased capability of these vehicles is to a large part due to advances in the electronics industry, which have enabled complex and cumbersome mechanical controls to be replaced with more streamlined electronic devices. The conversion from mechanical to electronic controls has been rather haphazard, however, with each electronic device developed independently of the others, each having its own separate set of wires. Because no attempt has been made to integrate the various electronic devices into a single unit, the wiring within a typical fire truck has come to resemble a maze consisting of hundreds of wires. The huge number of wires becomes a problem when an electrical malfunction occurs, forcing a technician to test each of the lines individually in order to diagnose, monitor, and repair the problem.

Accordingly, the object of this invention is to provide a multiplexing system for integrating the electronic controls of a fire truck or similar vehicle in order to reduce sensor duplication, increase flexibility, simplify the wiring and facilitate diagnosis of electronic problems.

SUMMARY OF THE INVENTION

The aforementioned and other objects of the invention are accomplished by an apparatus multiplexing system which controls and monitors all the electrical functions of a vehicle through a common two-wire data link. The system comprises a switch control unit which receives inputs from a number of sources such as switches and gauges on the dash panel of the vehicle, and converts these inputs into digital signals which are sent through two pairs of redundant wires to a microprocessor which decodes the signals and sends them to a power distribution unit. The power distribution unit then responds to the signals by sending out, shutting off, increasing or decreasing the power to different parts of the vehicle as needed.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which.

DETAILED DESCRIPTION OF THE PREFERRED EMBODIMENTS

Figure 1:
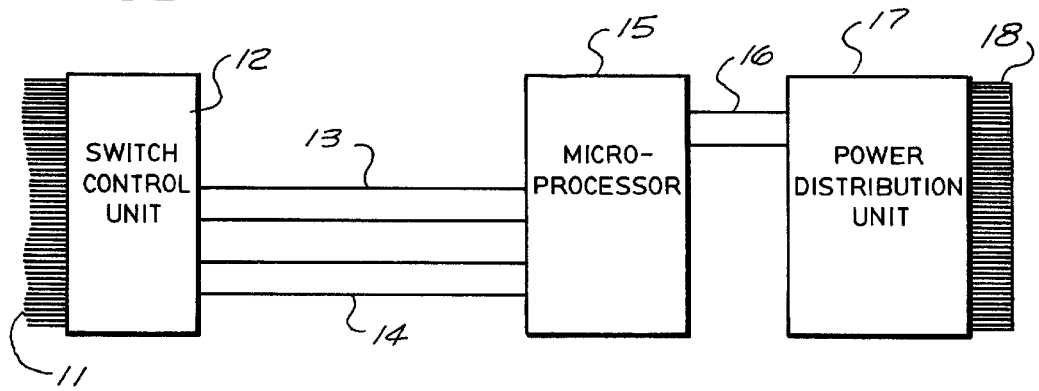
FIG. 1 is a schematic diagram of the multiplexing system according to the present invention.
Figure 2:
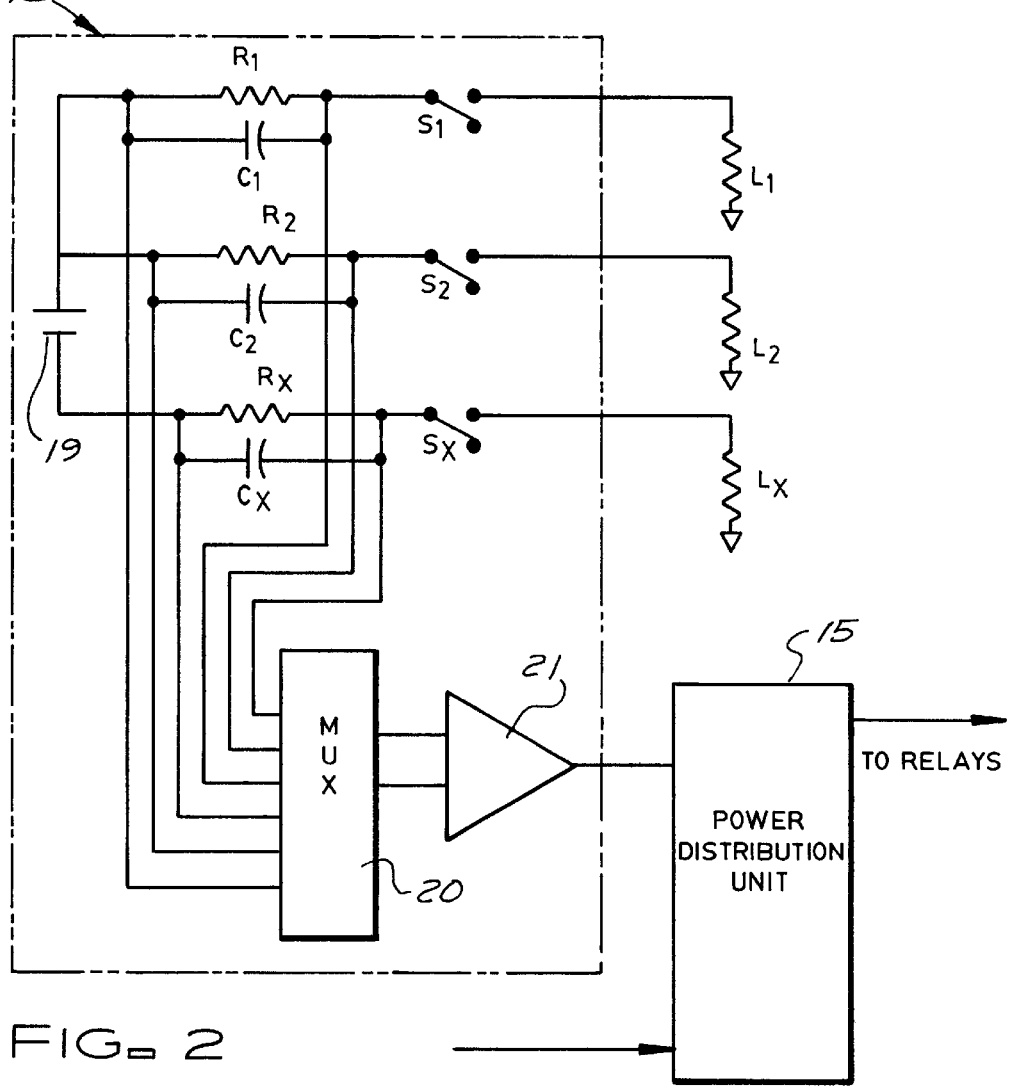
FIG. 2 is a circuit diagram showing the switch control unit.

Turning now to the drawings in which like reference numerals indicate corresponding parts throughout the various views, attention is first directed to FIG. 1, which shows the multiplexing system according to the present invention indicated in its entirety by the numeral 10. The multiplexing system comprises a switch control unit 12 receiving inputs from a number of sources such as switches, gauges, etc. on the dash panel of a fire truck. The switch control unit 12 is coupled by two pairs of redundant wires 13, 14 to a microprocessor 15 which in turn is coupled by another pair of wires 16 to a power distribution unit 17, which distributes power to the relay boards and various other loads 18 such as a pressure governor, lights, and instrumentation. The network consists of the parallel connection of a supply voltage or ground 19 and a number of loads $L_1, L_2 \ldots L_x$, which may include brake, compartment, warning and turning lights, pumps, instrumentation, air conditioning, fans, transmissions and the like. Each load $L_1, L_2 \ldots L_x$ is connected via a relay or solid state switch $S_1, S_2 \ldots S_x$ in series with a parallel connection of a resistor $R_1, R_2 \ldots R_x$ and a capacitor $C_1, C_2 \ldots C_x$. Each RC circuit is connected to a multiplexer 20 which in turn feeds the output of an amplifier 21 to the microprocessor 15.

The system 10 monitors vehicle functions in the following fashion:

When the system 10 is first installed on a vehicle and power is applied, a distinct signal is sent to the microprocessor 15. The signal instructs the microprocessor 15 to measure and "learn" or record in its memory the transient and steady state currents for each load as that load is applied. Until the readings are taken, the excess current limit for each load is set at maximum. After the readings are taken, the learned levels remain in memory and are used as the "normal" limits for the loads. Lower and upper limits, e.g. normal ±10%, normal ±20%, normal ±50%, etc. can then be set according to the application. The limits can also be preset in memory by instructing the microprocessor via data bus. In addition, the system can be reprogrammed at any time by reinitializing the learn cycle.

Once the current limits have been established, the microprocessor 15 multiplexes the voltage through each circuit in turn, measures its current, and determines whether the current is within the limits, taking into account any momentary allowable excesses due to transient conditions. If the current in any circuit is too high, the microprocessor 15 sends a signal to the power distribution unit 17 to open that circuit and another signal to the system user via a visual or audible alarm. The microprocessor 15 will also notify the user if the current is too low. All circuits, including inactive ones, can be measured in this way to test for possible failed relays or solid state switches.

The microprocessor 15 cycles through the entire system in a few milliseconds and repeats the procedure as many times as determined necessary for a given application. The cycle rate, duration of measurement and sequence are also functions of the application.

The measurement cycle consists of two phases for each load—a transient phase and a steady state phase. When a circuit is being closed, the microprocessor 15 can be devoted to that circuit until the transient phase has ended to ensure the transient current does not exceed the learned or preset levels. If a load, such as a heavily loaded motor, has a long start-up cycle, the transient phase of the cycle can be interrupted provided the transient is within learned limits, while the steady state phase can continue for the remaining circuits.

In addition to monitoring the output currents associated with each individual load, the microprocessor 15 also sums up the various output currents to determine if the total current is excessive. If so, a signal is sent to the power distribution unit 17 to disengage the loads which have been determined and preset by the user to be less critical. Similarly, if the input voltage is determined to be too low, loads will be shed in a predetermined sequence depending on priorities set by the user. Simultaneously, a signal will be issued to increase the supply voltage by increasing engine speed or similar measures. When the supply voltage increases, the disengaged loads can be reapplied. These loads will be applied sequentially to prevent drastic changes in loading. To prevent unwanted system oscillations, time delays can be incorporated in the disengagement and reconnection of the loads.

Another function of the microprocessor 15 is to acquire and monitor data associated with various devices on the vehicle, such as the brake and turning lights, pumps, instrumentation, air conditioning and the like. A real time clock can be included to allow the data to be recorded in a memory internal to the unit. Alternatively, the microprocessor 15 can be connected to an external computer or modem and the data broadcast either as events occur or when queried through a diagnostic terminal.

Various other modifications and variations to the embodiments herein chosen for purposes of illustration will readily occur to those skilled in the art. For instance, the invention could be very easily adapted for use in non-automotive applications, including but not limited to, emergency systems where the system status must be monitored and checked at all times. To the extent that such variations and modifications do not depart from the spirit of the invention, they are intended to be included within the scope thereof which is assessed only by a fair interpretation of the following claims.

What is claimed is:

1. A multiplexing system for integrating electronic controls, the system comprising:
   input receiving means for receiving inputs from a first set of electrical devices in an electronically controlled apparatus and converting the inputs into digital signals;
   a microprocessor for decoding and monitoring the digital signals;
   a pair of wires electronically coupled to the input receiving means and the microprocessor for transmitting input and output signals between the input receiving means and the microprocessor;
   power distribution means for distributing power to a second set of electricl devices in the apparatus in response to the digital signals as decoded by the microprocessor; and
   a pair of wires electronically coupled to the microprocessor and the power distribution means for transmitting input and output signals between the microprocessor and the power distribution means.

2. A multiplexing system according to claim 1, wherein the electrical devices in said first set are connected in parallel with one another.

3. A multiplexing system according to claim 2, wherein the input receiving means comprises:
   a multiplexer; and
   switch means connected in series with each of the electrical devices in said first set for selectively connecting each electrical device to the multiplexer.

4. A multiplexing system according to claim 3, wherein the switch means comprises a plurality of switches or relays, each of the switches or relays connected in series with a different one of the electrical devices in said first set.

5. A multiplexing system according to claim 4, further comprising noise reduction means located intermediate each of the switches or relays and the multiplexer.

6. A multiplexing system according to claim 5, wherein the noise reduction means comprises a plurality of capacitors, each capacitor being connected in parallel with a resistor in series with a different one of the switches or relays.

7. A multiplexing system according to claim 3, wherein the input receiving means further comprises an amplifier having an input end electrically connected to the multiplexer and an output end electrically coupled to the microprocessor.

8. A multiplexing system for integrating electronic controls, the system comprising:
   input receiving means for receiving inputs from a plurality of electrical devices connected in parallel with one another in an electronically controlled apparatus and converting the inputs into digital signals, the input receiving means including
   a multiplexer,
   switch means connected in series with each of the electrical devices for selectively connecting each electrical device to the multiplexer, the switch means comprising a plurality of switches or relays, each of the switches or relays connected in series with a different one of the electrical devices, and
   noise reduction means located intermediate each of the switches or relays and the multiplexer;
   a microprocessor for decoding and monitoring the digital signals;
   a pair of wires electronically coupled to the input receiving means and the microprocessor for transmitting input and output signals between the input receiving means and the microprocessor;
   power distribution means for distributing power to various parts of the apparatus in response to the digital signals as decoded by the microprocessor; and
   a pair of wires electronically coupled to the microprocessor and the power distribution means for transmitting input and output signals between the microprocessor and the power distribution means.

9. A method for monitoring electrical functions in a system including a plurality of circuits, the method including the steps of:
   determining an acceptable current range for each circuit, the step of determining an acceptable current range comprising the substeps of
   instructing a microprocessor to take an initial current reading for each circuit,
   storing the initial current reading for each circuit in the memory of the microprocessor,
   setting a maximum acceptable current equal to the initial current reading for each circuit plus a predetermined percentage, and
   setting a minimum acceptable current equal to the initial current reading for each circuit minus a predetermined percentage;
   multiplexing a voltage through each circuit in sequence;
   measuring the current in each circuit;
   determining whether the current in each circuit falls within the acceptable current range; and
   activating an alarm if the current in any circuit falls outside the acceptable current range.

10. A method for monitoring electrical functions in a system including an input voltage and a plurality of circuits, each circuit including a load and an output current, the method including the steps of:
   determining an acceptable current range for each circuit;
   multiplexing a voltage through each circuit in sequence;
   measuring the current in each circuit;
   determining whether the current in each circuit falls within the acceptable current range;
   activating an alarm if the current in any circuit falls outside the acceptable current range;

adding the output currents associated with each load to determine a total system current;

comparing the total system current to a predetermined maximum current; and disengaging non-critical loads if the total system current exceeds the predetermined maximum current, wherein the non-critical loads are shed in a predetermined sequence depending on priorities set by the user.

11. A method according to claim 10, further comprising the steps of:

measuring the input voltage of the system;

determining whether the input voltage is sufficient; and disengaging non-critical loads if the input voltage is determined to be insufficient, wherein the non-critical loads are shed in a predetermined sequence depending on priorities set by the user.

12. A method according to claim 11, further comprising the step of increasing the input voltage simultaneously with disengaging the non-critical loads if the input voltage is determined to be insufficient.

* * * * *